US012611695B2

(12) United States Patent
Beebe

(10) Patent No.: US 12,611,695 B2
(45) Date of Patent: Apr. 28, 2026

(54) PIEZO-ACTUATED VALVE AND DISPENSE CASSETTE

(71) Applicant: Fishman Corporation, Hopkinton, MA (US)

(72) Inventor: W. Scott Beebe, Berkley, MA (US)

(73) Assignee: FISHMAN CORPORATION, Hopkinton, MA (US)

( * ) Notice: Subject to any disclaimer, the term of this patent is extended or adjusted under 35 U.S.C. 154(b) by 269 days.

(21) Appl. No.: 18/483,686

(22) Filed: Oct. 10, 2023

(65) Prior Publication Data

US 2024/0116073 A1 Apr. 11, 2024

Related U.S. Application Data

(60) Provisional application No. 63/413,998, filed on Oct. 7, 2022.

(51) Int. Cl.
| | |
|---|---|
| *B05C 11/10* | (2006.01) |
| *B05C 5/02* | (2006.01) |
| *F16K 31/00* | (2006.01) |

(52) U.S. Cl.
CPC ........ *B05C 11/1013* (2013.01); *B05C 5/0225* (2013.01); *F16K 31/004* (2013.01)

(58) Field of Classification Search
CPC . B05B 1/3046; B05C 1/3033; B05C 11/1013; B05C 11/1002; B05C 11/1028; B05C 11/1034; B05C 5/02
See application file for complete search history.

(56) References Cited

U.S. PATENT DOCUMENTS

| | | | |
|---|---|---|---|
| 8,662,352 B1 | 3/2014 | Des Jardins et al. | |
| 10,286,415 B2 | 5/2019 | Lithell et al. | |
| 2016/0136664 A1* | 5/2016 | Hong | B05C 5/0237 222/387 |
| 2016/0199857 A1* | 7/2016 | Aguilar | B05C 5/0237 239/584 |
| 2020/0122181 A1 | 4/2020 | Dix et al. | |

OTHER PUBLICATIONS

International Search Report and Written Opinion issued in related Application Serial No. PCT/US2023/076409 on Feb. 21, 2024.
Thailand Office Action issued in related Application Serial No. 2501002278 on Jul. 21, 2025.

* cited by examiner

*Primary Examiner* — Jennifer C Chiang
(74) *Attorney, Agent, or Firm* — Mark H. Whittenberger; Holland & Knight LLP

(57) ABSTRACT

Embodiments included herein are directed towards apparatuses, systems, and methods for fluid dispensing. Embodiments may include piezo-actuated valves, dispense cassettes, and closed loop systems for regulating pressure associated with fluid dispensers. Embodiments of an apparatus may include a piezo-actuated valve and a dispense cassette.

11 Claims, 15 Drawing Sheets

Piezo Valve and Dispense Cassette

100

Twist to Connect (TTC) Dispense Gun

Piezo Valve

Piezo Valve and
Dispense Cassette

100

Twist to Connect (TTC)
Dispense Gun

Piezo Valve

Drive Linkage

300

Piezo-Activated Valve Configured For Solder Paste

Offline Gun Loading ~ Reload
Multiple TTC Dispense Guns.

Ready to Load Cassette                Cassette Loaded                Cassette Locked Full Syringe Emtpy Storage

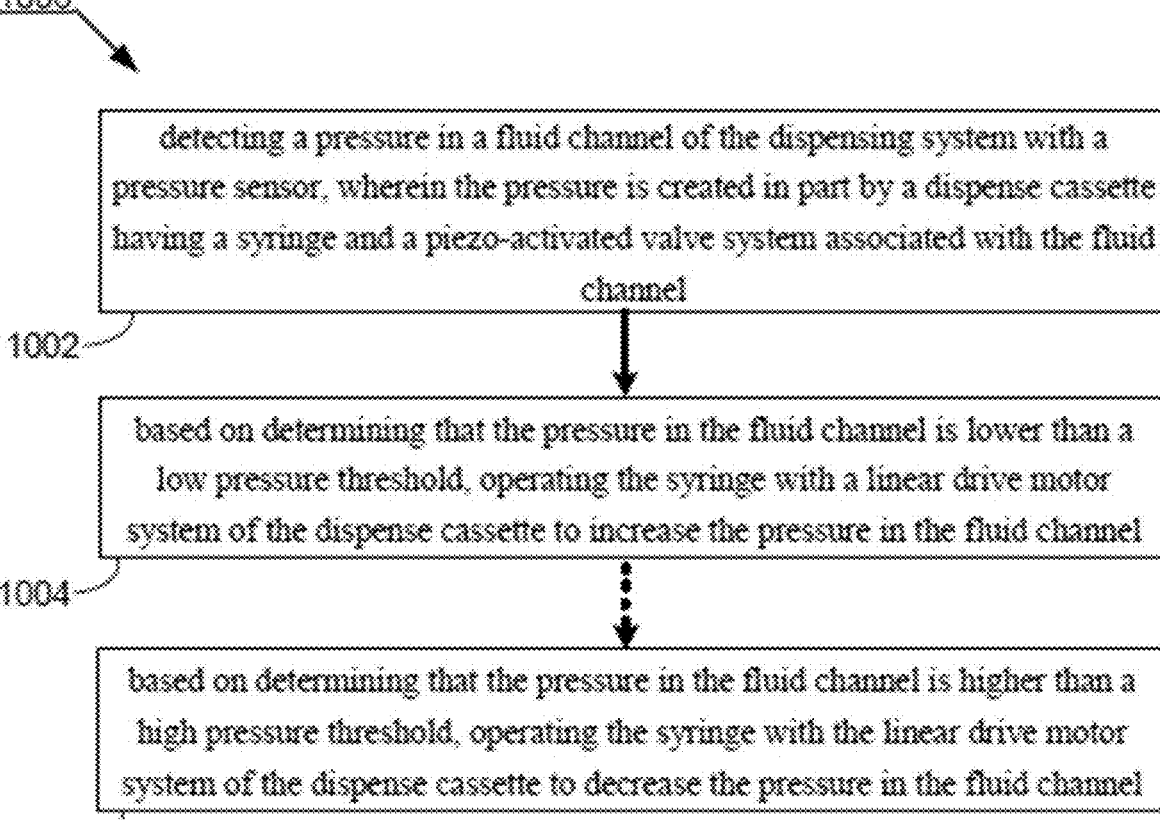

1000 detecting a pressure in a fluid channel of the dispensing system with a pressure sensor, wherein the pressure is created in part by a dispense cassette having a syringe and a piezo-activated valve system associated with the fluid channel

1002 based on determining that the pressure in the fluid channel is lower than a low pressure threshold, operating the syringe with a linear drive motor system of the dispense cassette to increase the pressure in the fluid channel

1004 based on determining that the pressure in the fluid channel is higher than a high pressure threshold, operating the syringe with the linear drive motor system of the dispense cassette to decrease the pressure in the fluid channel

Dispense Cassette Assy
Shown in Load Position

Dispense Cassette Assy
Shown in Locked Position

1300

1302

1304

1306

1308

1310

PIEZO-ACTUATED VALVE AND DISPENSE CASSETTE

CROSS-REFERENCE TO RELATED APPLICATIONS

The present application claims priority to U.S. provisional application No. 63/413,998 filed on Oct. 7, 2022, the entire contents of which is hereby incorporated by reference in its entirety.

BACKGROUND

In some situations it may be desirable to dispense small and controlled amounts of fluid in a specific location. For example, it may be desirable to dispense an adhesive in an automated production line, such as dispensing a fraction of a milliliter of adhesive on a specific portion of a product. Further, in a production environment, it may be desirable to have as few interruptions as possible (e.g., in an automated assembly line). Interruptions may occur when a fluid dispenser needs to be refilled or replaced. In these situations, the assembly line may need to be halted, the fluid dispenser may need to be removed, and a full dispenser may need to be placed properly into position. Some assembly lines may use several fluid dispensers, each of which may need to hold fluid. This situation may lead to the need to stop production frequently to refill or replace empty fluid dispensers.

SUMMARY OF THE DISCLOSURE

As will be discussed in greater detail below, embodiments of the present disclosure are directed towards apparatuses, systems, and methods for fluid dispensing. Embodiments of an apparatus may include a piezo-actuated valve. The apparatus may further include a dispense cassette.

Some or all of the following features may be included. The piezo-actuated valve may include a piezo actuator. The piezo actuated-valve may further include a drive linkage configured to be actuated by the piezo actuator. The piezo-actuated valve may also include a tappet configured to having an open position and a closed position based on a piezo actuator of the piezo-actuated valve. The dispense cassette may include a syringe loadable by a twist to connect loader. A top portion of the twist to connect loader may be configured to twist into the dispense cassette to load the syringe. A bottom portion of the twist to connect loader may be configured to twist into a fluid delivery attachment of the apparatus to lock the dispense cassette into the apparatus. The dispense cassette may further include a linear drive motor system configured to operate the syringe. The apparatus may further include a fluid reservoir and a fluid channel. The apparatus may also include a pressure sensor configured to detect pressure in the fluid channel. The linear drive motor system may be configured to operate the syringe based on the pressure in the fluid channel. The linear drive motor system may be configured to operate the syringe to increase pressure in the fluid channel based on detection of low pressure in the fluid channel by the pressure sensor. The linear drive motor system may be configured to operate the syringe to decrease pressure in the fluid channel based on detection of high pressure in the fluid channel by the pressure sensor. The pressure sensor, the linear drive motor system, the syringe, and the fluid channel may create a closed loop system configured to regulate pressure in the fluid channel.

Embodiments of a dispensing system may include a piezo-actuated valve comprising a piezo actuator and a drive linkage configured to be actuated by the piezo actuator. The dispensing system may further include a dispense cassette comprising a syringe loadable by a twist to connect loader configured to twist into the dispense cassette to load the syringe. The dispensing system may also include a linear drive motor system configured to operate the syringe. The dispensing system may additionally include a closed loop system configured to regulate pressure in a fluid channel of the dispensing system by operating the syringe with the linear drive motor system based on a pressure detected in the fluid channel by a pressure sensor of the dispensing system.

Some or all of the following features may be included. The linear drive motor system may be configured to operate the syringe to increase pressure in the fluid channel based on detection of low pressure in the fluid channel by the pressure sensor. The linear drive motor system may be configured to operate the syringe to decrease pressure in the fluid channel based on detection of high pressure in the fluid channel by the pressure sensor. The pressure sensor, the linear drive motor system, the syringe, and the fluid channel may create a closed loop system configured to regulate pressure in the fluid channel.

In an embodiment, a method for regulating pressure in a dispensing system may include detecting a pressure in a fluid channel of the dispensing system with a pressure sensor, wherein the pressure is created in part by a dispense cassette having a syringe and a piezo-activated valve system associated with the fluid channel. The method may further include, based on determining that the pressure in the fluid channel is lower than a low pressure threshold, operating the syringe with a linear drive motor system of the dispense cassette to increase the pressure in the fluid channel.

Some or all of the following features may be included. The method may include, based on determining that the pressure in the fluid channel is higher than a high pressure threshold, operating the syringe with the linear drive motor system of the dispense cassette to decrease the pressure in the fluid channel. The pressure sensor, the linear drive motor system, the syringe, and the fluid channel may create a closed loop system configured to regulate the pressure in the fluid channel.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

FIG. 10 illustrates example operations of a method according to embodiments of the present disclosure;

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the embodiments and/or implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms.

These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

It may be desirable to design fluid dispensing systems in a manner that allows fluid dispensers to be replaced more quickly or as quickly as possible. Further, it may be desirable to regulate or control pressure in fluid channels of fluid dispensing systems. Using the techniques and features described by the present disclosure, fluid dispensers may be replaced more quickly and pressure in fluid channels of fluid dispensing systems may be regulated or controlled.

Embodiments of the present disclosure are directed towards apparatuses, systems, and methods for fluid dispensing. The apparatuses, systems, and methods for fluid dispensing and/or the various techniques and features described by the present disclosure may be included in one or more products, such as SmartJet™ products, which may be available from the assignee of the present discloser.

Figure 1:
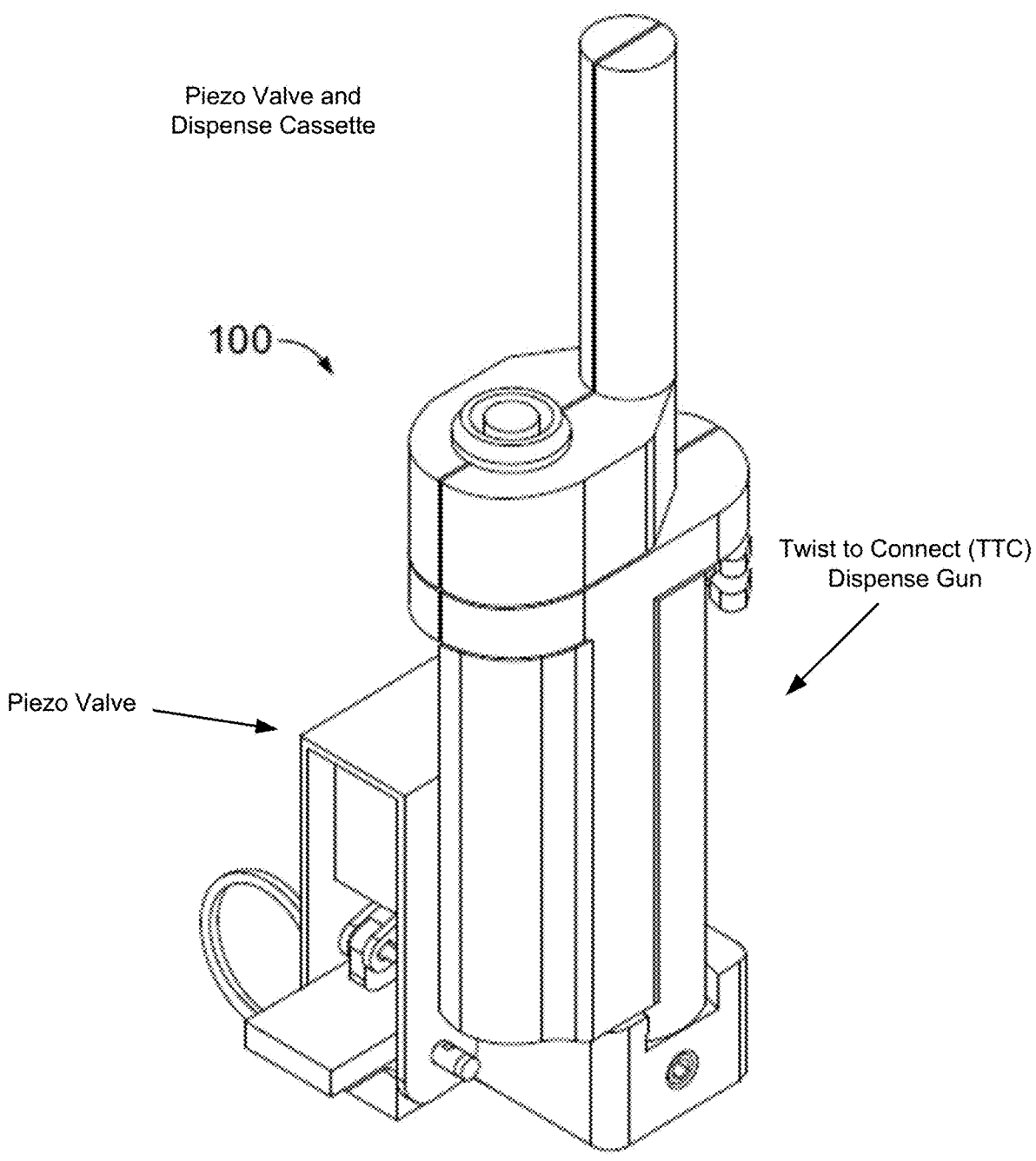
FIG. 1 illustrates an example apparatus according to embodiments of the present disclosure.

Referring to FIG. 1, an example apparatus 100 for fluid dispensing according to embodiments of the present disclosure is shown. The apparatus 100 may include a piezo-actuated valve, which may also be referred to as a piezo-activated valve or piezo valve. The apparatus 100 may further include a dispense cassette. The dispense cassette may include a twist to connect (TTC) dispense gun. For example, the dispense cassette may include a linear drive motor system with a twist to connect or disconnect feature. A fluid delivery attachment may also be included.

Figure 2:
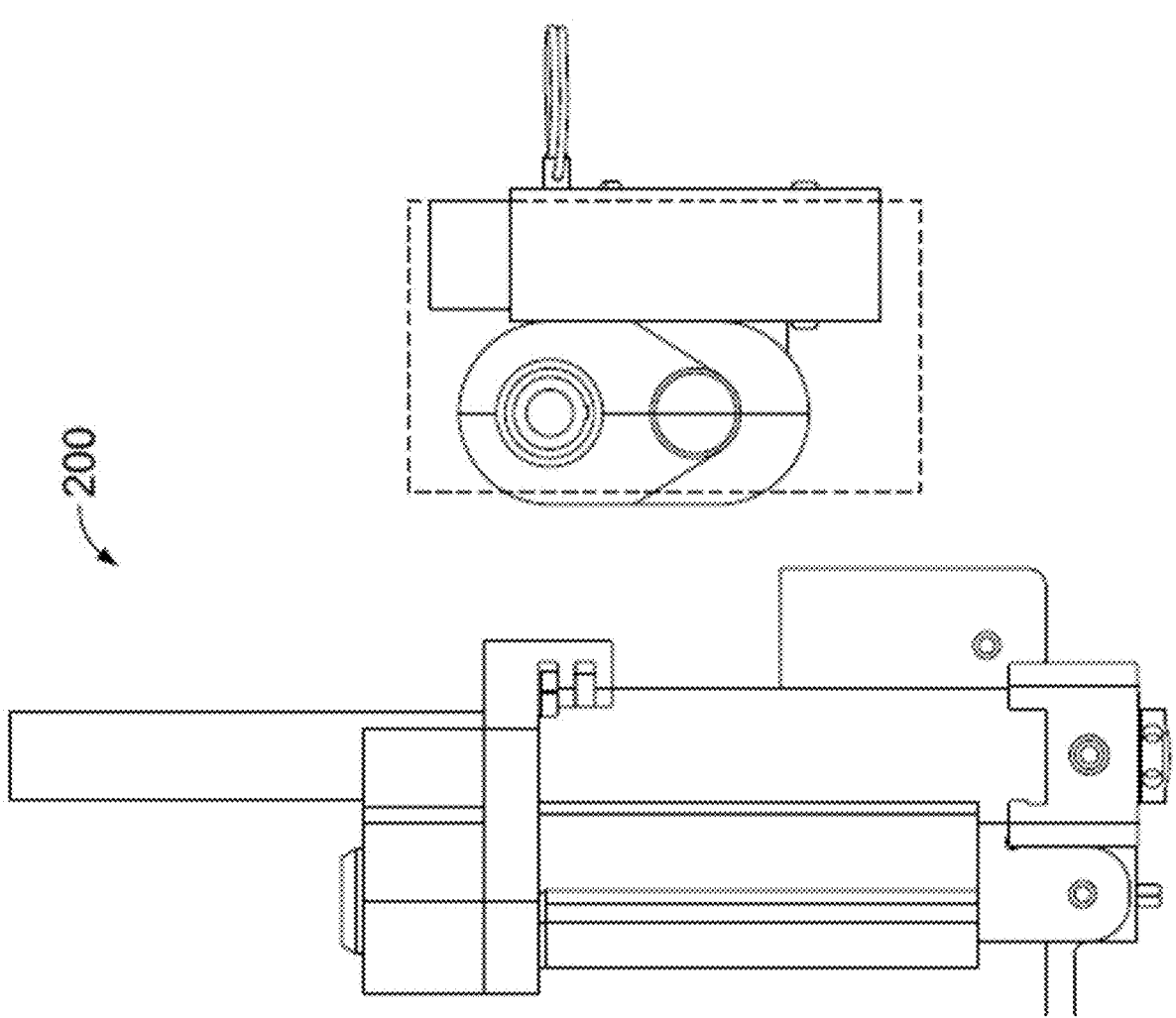
FIG. 2 illustrates a an example apparatus and size context for the apparatus according to embodiments of the present disclosure.

Referring to FIG. 2, an example apparatus 200 and size context for the apparatus according to embodiments of the present disclosure is shown. For example, the apparatuses 100 and 200 shown in FIGS. 1 and 2, respectively, may have a height (e.g., as shown on the left side of FIG. 2) similar to or slightly greater than two standard business cards. Further, the apparatuses 100 and 200 shown in FIGS. 1 and 2 may have a depth (e.g., as shown on the right side of FIG. 2) similar to or slightly greater than one standard business card.

Figure 3:
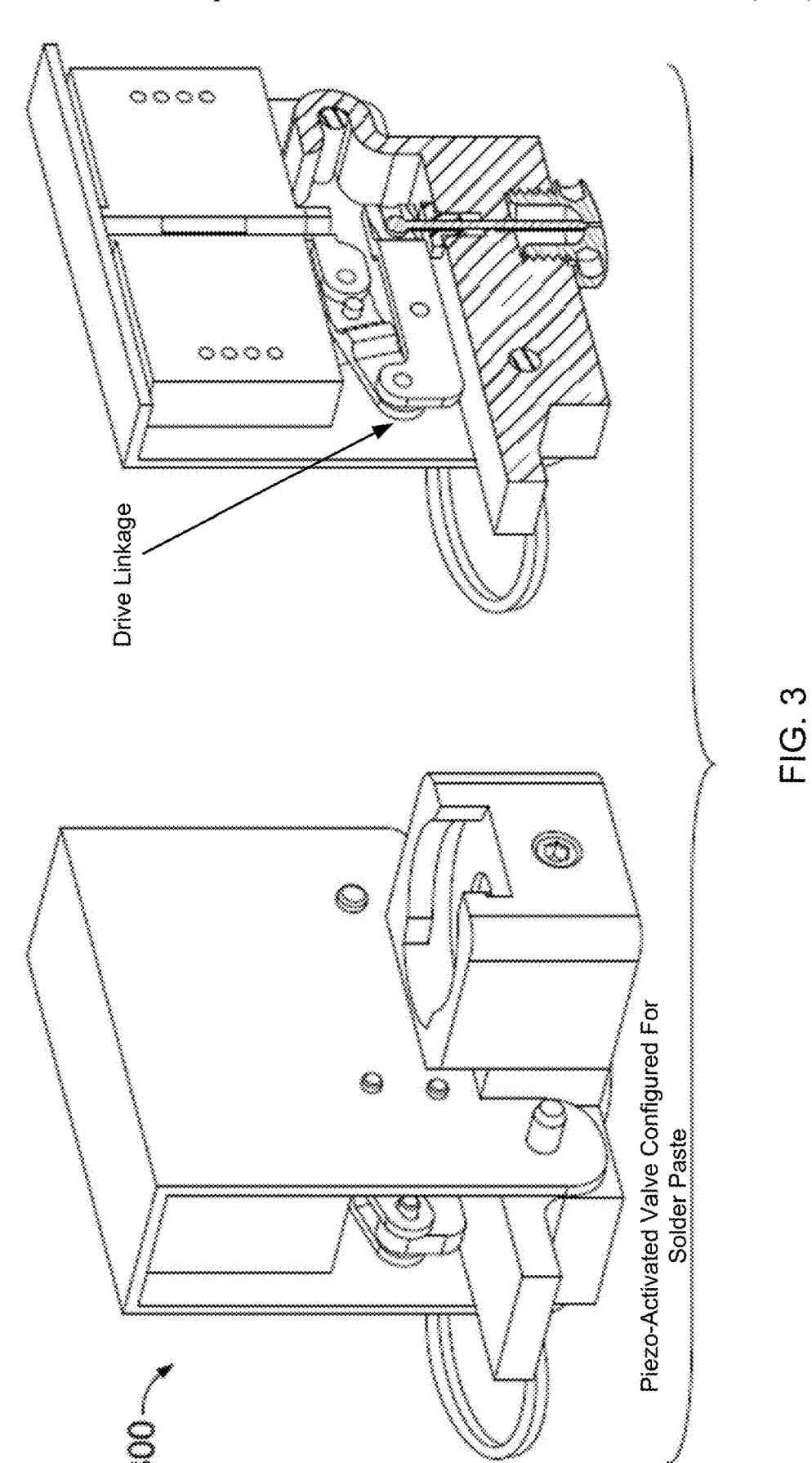
FIG. 3 illustrates an example piezo-activated valve and a cross-sectional view thereof, according to embodiments of the present disclosure.

Referring to FIG. 3, an example piezo-activated valve 300 and a cross-sectional view thereof, according to embodiments of the present disclosure, are shown. The piezo-activated valve 300 may be configured for use with solder paste, however, this is noted for example purposes only and piezo-activated valves described herein may be configured for use with many fluids or fluid-like substances including, but not limited to, adhesives or other industrial fluids or substances. As shown in the cross-sectional view of the piezo-activated valve 300 (e.g., on the right side of FIG. 3), the piezo-activated valve 300 may include a piezo-actuator, a drive linkage, and a tappet (e.g., a needle). The piezo-activated valve 300 may also include detachable fluid channel and/or fluid chamber.

Figure 4:
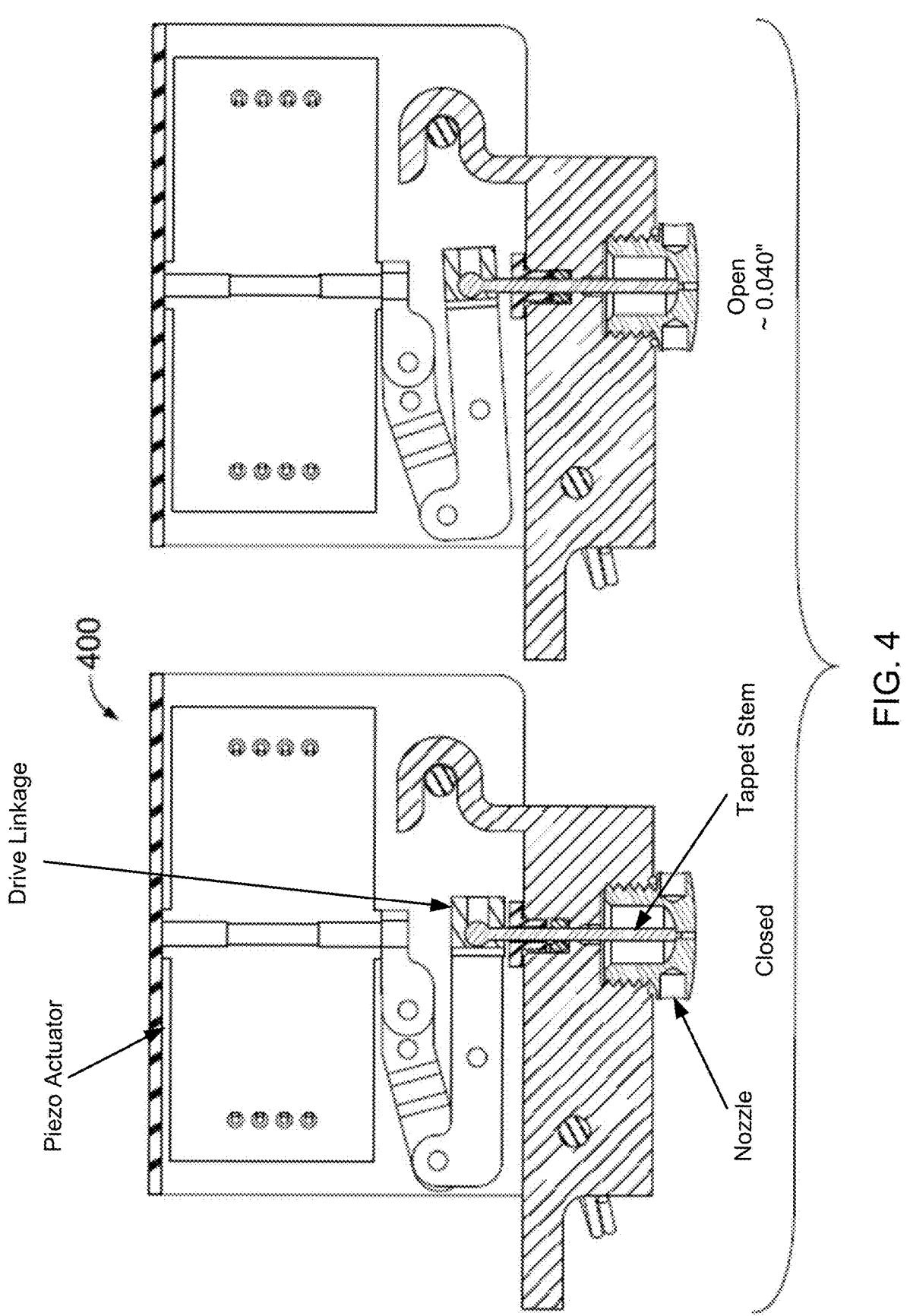
FIG. 4 illustrates cross-sectional views of an example piezo-activated valve according to embodiments of the present disclosure.

Referring to FIG. 4, cross-sectional views of an example piezo-activated valve 400 according to embodiments of the present disclosure are shown. As shown, the piezo-actuated valve 400 may include a piezo actuator. The piezo actuated-valve may further include a drive linkage. The drive linkage may be configured to be actuated by the piezo actuator. The piezo-actuated valve may also include a nozzle and a tappet, which, as shown, may have a tappet stem. The tappet may be configured to have an open position and a closed position, based on the piezo actuator of the piezo-actuated valve. For example, when the piezo actuator is not activated, the tappet may have a closed position, which may keep the piezo-activated valve 400 closed (e.g., as shown on the left side of FIG. 4). Alternatively, when the piezo actuator is activated, the tappet may have an open position, which may keep the piezo-activated valve 400 open (e.g., as shown on the right side of FIG. 4). The open position of the tappet may correspond to, for example, 0.040".

Figure 5:
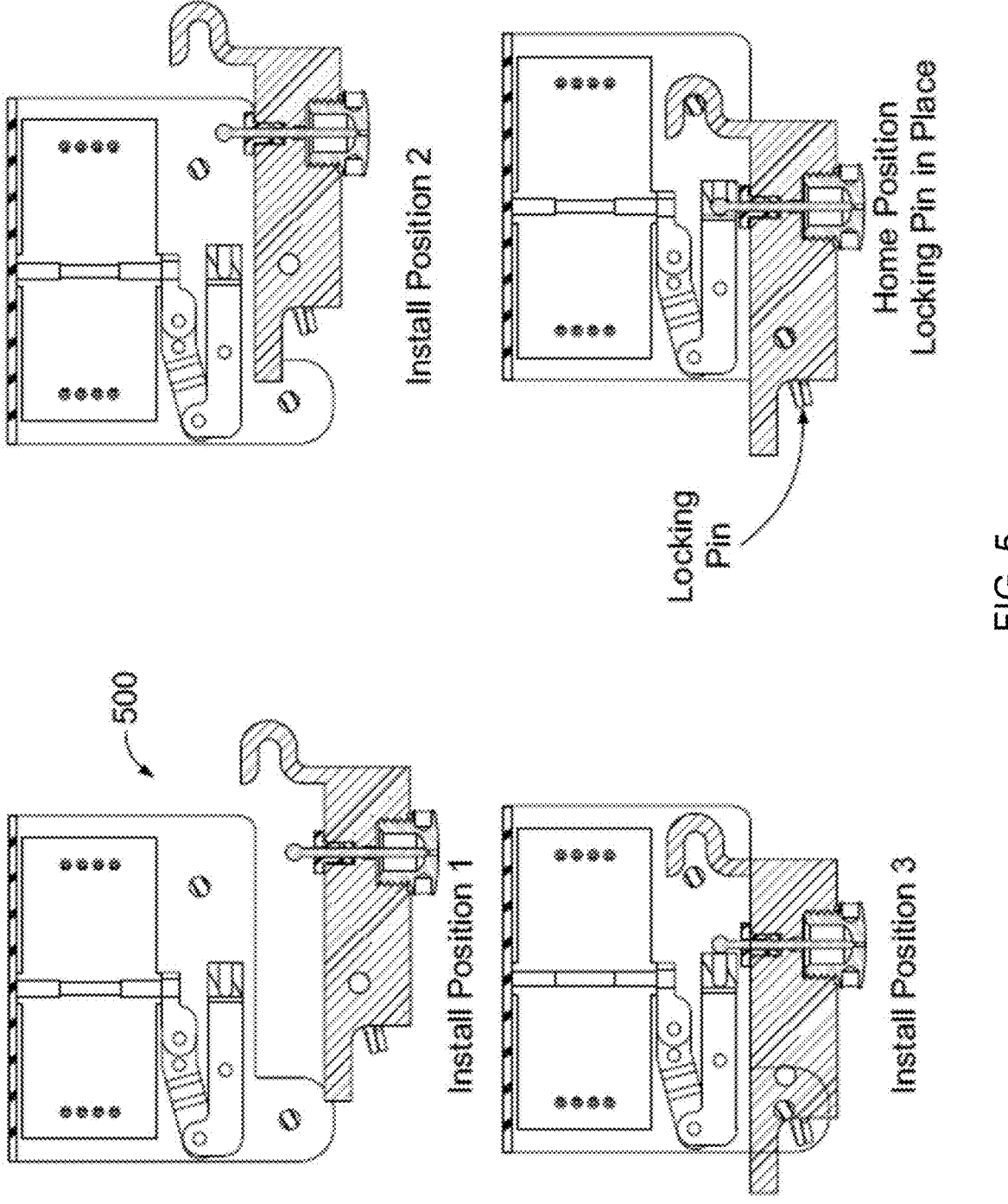
FIG. 5 also illustrates cross-sectional views of an example piezo-activated valve according to embodiments of the present disclosure.

Referring to FIG. 5, further cross-sectional views of an example piezo-activated valve 500 according to embodiments of the present disclosure are shown. As shown, the example piezo-activated valve 500 may be removably attached to a component that includes the tappet and/or a fluid reservoir, and four corresponding install positions are shown. For example, an Install Position 1 is shown on the top left of FIG. 5, where the valve and the component are separate. Further, an Install Position 2 is shown on the top right of FIG. 5, where the valve may be initially placed on the component. Also, an Install Position 3 is shown on the bottom left of FIG. 5, where the valve may be placed further on the component. Additionally, a Home Position is shown on the bottom right of FIG. 5, where the valve may be locked to the component with a locking pin. For example, a top portion of the tappet may operably interface or operably couple with the drive linkage and a locking pin may be positioned in place to lock the valve to the component with the top portion of the tappet operably interfaced or operably coupled with the drive linkage.

Figure 6:
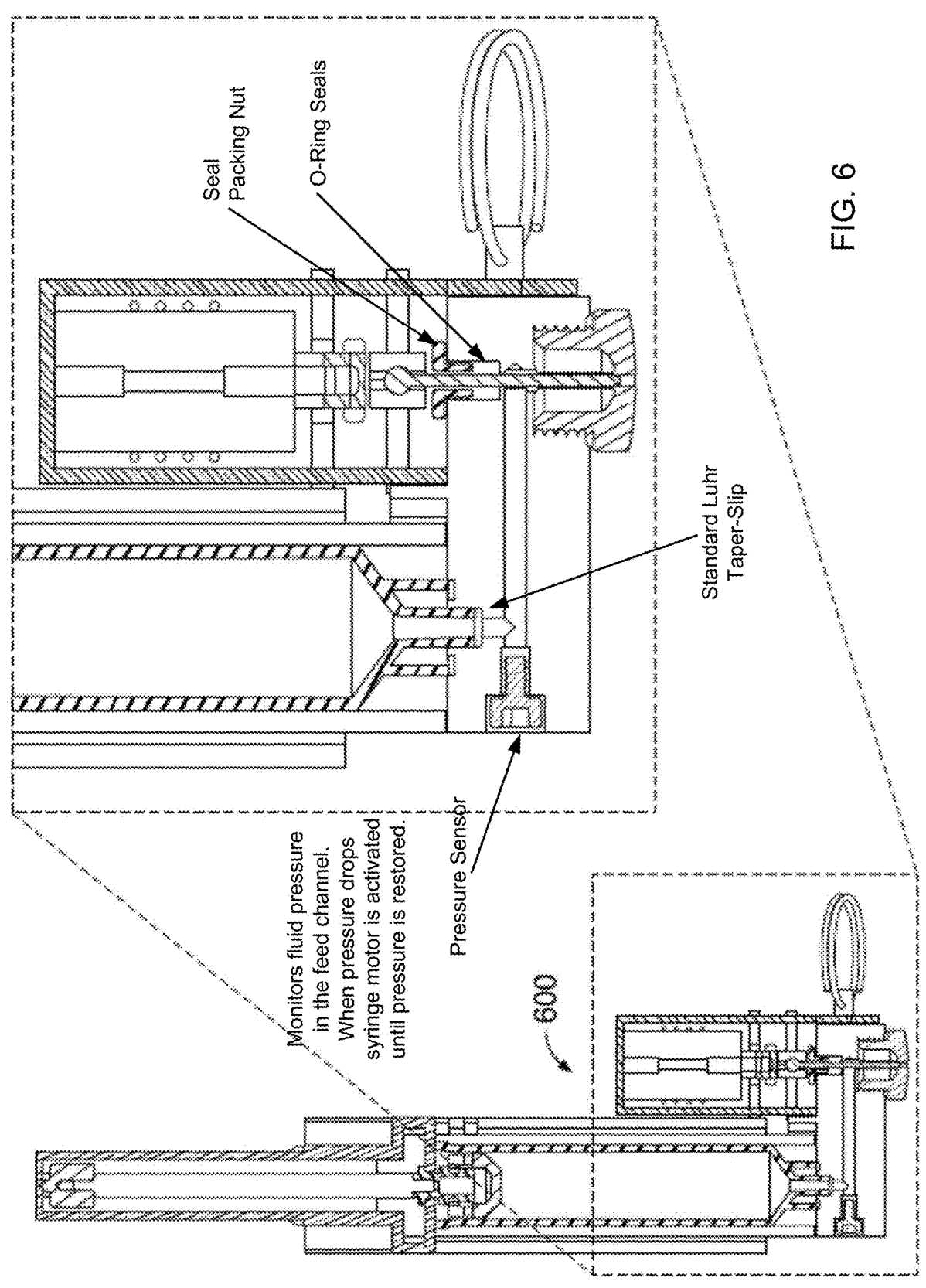
FIG. 6 illustrates cross-sectional views of an example dispensing system according to embodiments of the present disclosure.

Referring to FIG. 6, cross-sectional views of an example dispensing system 600 according to embodiments of the present disclosure are shown. As shown on the right side of FIG. 6, the dispensing system 600 may include a fluid reservoir and a fluid channel. The dispensing system 600 (or one or more of the apparatuses described above) may further include a pressure sensor configured to detect pressure in the fluid channel. The dispensing system 600 may also include a closed loop system configured to regulate pressure in the fluid channel of the dispensing system by operating a syringe with a linear drive motor system based on a pressure detected in the fluid channel by the pressure sensor of the dispensing system.

For example, the fluid reservoir to the fluid channel may be a syringe. By installing a pressure sensor, the pressure in the fluid channel may be quantified and monitored and if the pressure drops, the dispenser (e.g., SmartDispenser™ as may be available from the assignee of the present disclosure) may be notified to rotate the motor (e.g., linear drive motor system) until the fluid pressure is within a specification (and vice versa, should the pressure rise). In other words, the linear drive motor system may be configured to operate the syringe to increase pressure in the fluid channel based on detection of low pressure in the fluid channel by the pressure sensor. Further, the linear drive motor system may be configured to operate the syringe to decrease pressure in the fluid channel based on detection of high pressure in the fluid channel by the pressure sensor. In this way, the pressure sensor, the linear drive motor system, the syringe, and the fluid channel may create a closed loop system configured to regulate pressure in the fluid channel.

In embodiments, the syringe may include or interface with a standard Luhr taper-slip. Further, the tappet may be positioned, at least in part, with a seal packing nut and/or one or more O-ring seals.

Figure 7:
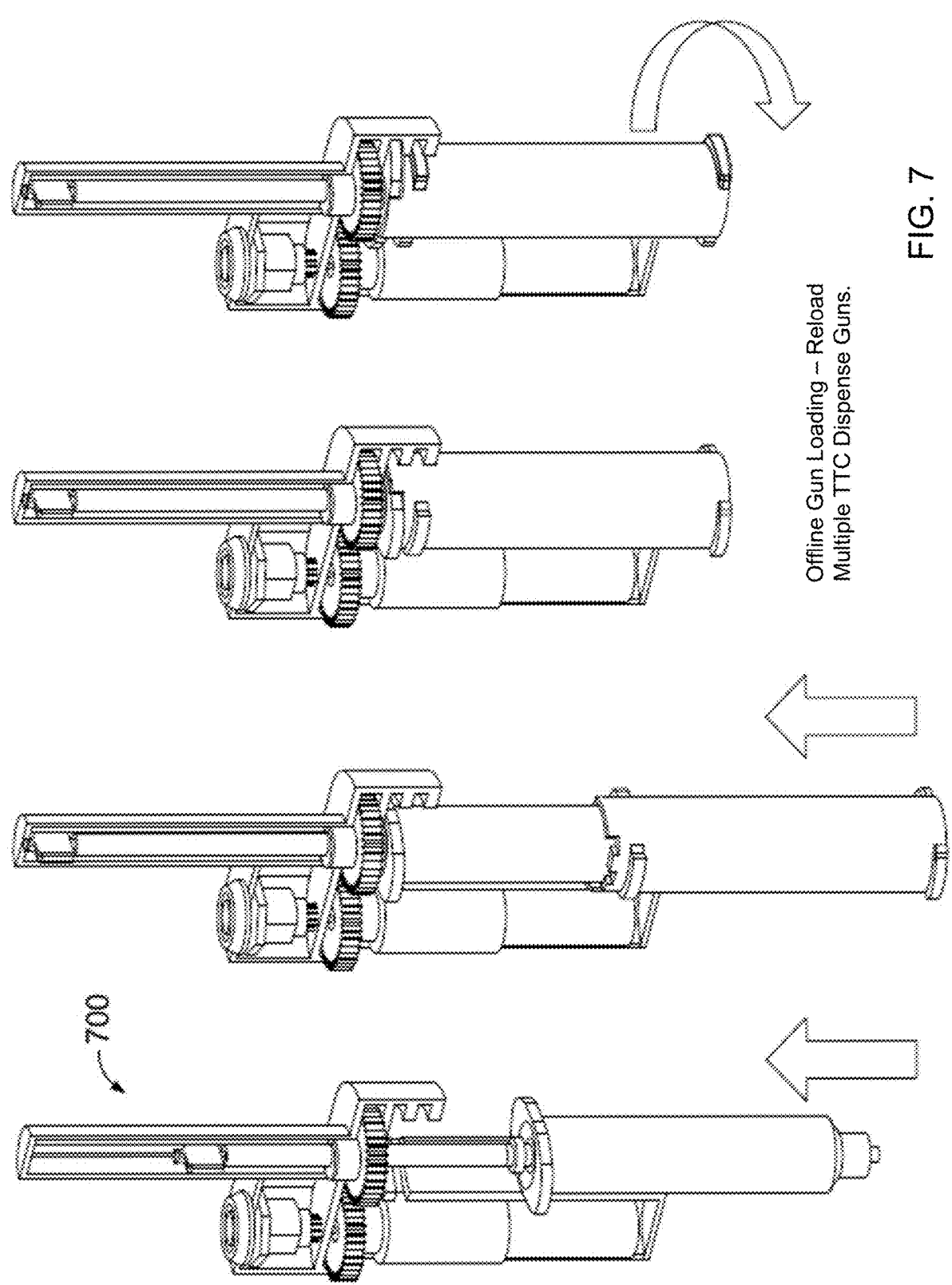
FIG. 7 illustrates cross-sectional views of a dispense cassette according to embodiments of the present disclosure.

Referring to FIG. 7, cross-sectional views of a dispense cassette 700 according to embodiments of the present disclosure, are shown. The dispense cassette 700 may include a syringe loadable by a twist to connect loader. As shown, a top portion of the twist to connect loader may be configured to twist into the dispense cassette to load the syringe. This may facilitate offline gun loading where multiple TTC dispense guns may be reloaded. Thus, the twist to connect (TTC) feature or device may allow for rapid syringe reservoir replacement when empty, thereby minimizing production downtime.

Figure 8:
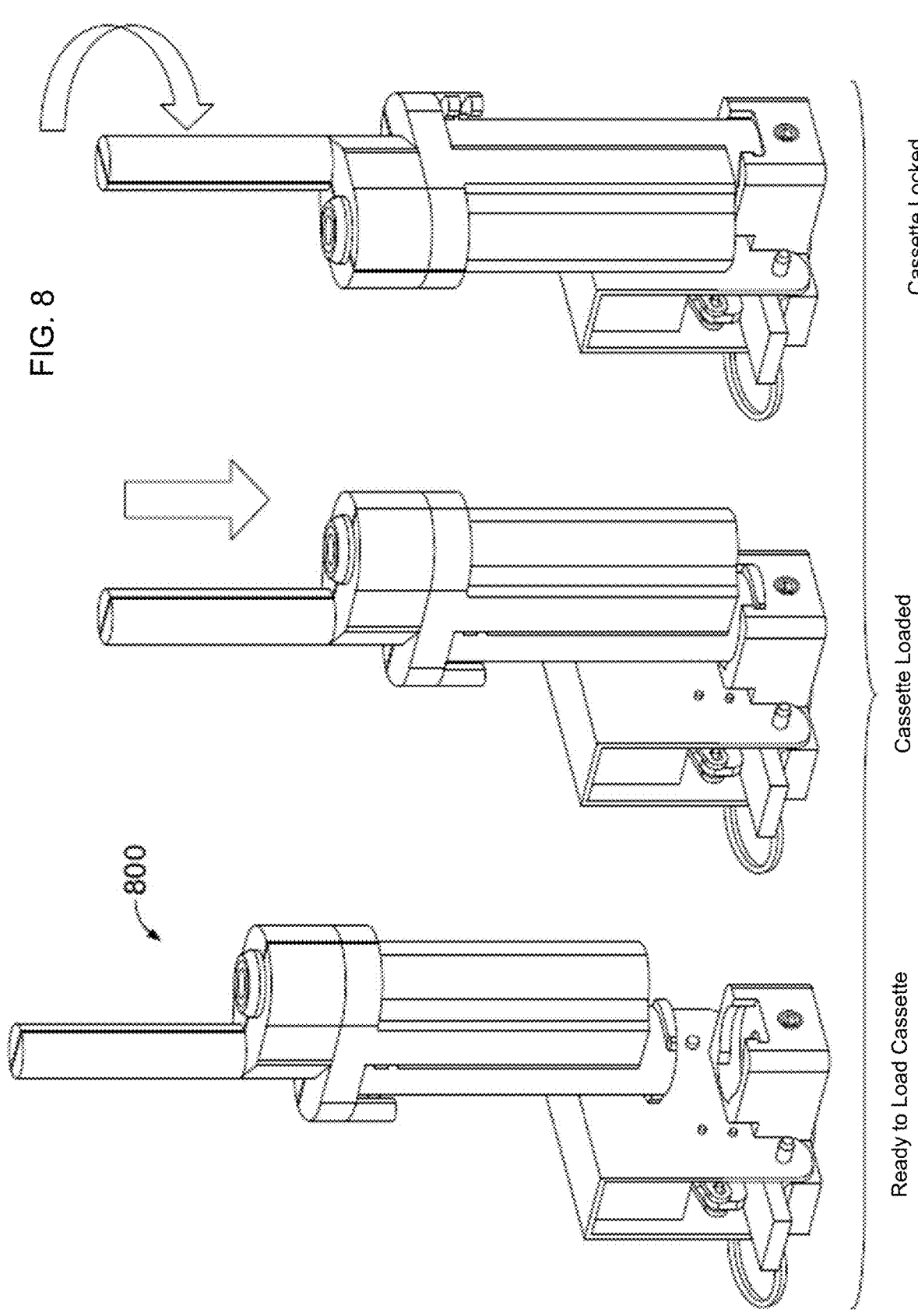
FIG. 8 illustrates views of a dispense cassette being loaded according to embodiments of the present disclosure.

Referring to FIG. 8, views of a dispense cassette 800 being loaded according to embodiments of the present disclosure are shown. As shown, a bottom portion of the twist to connect loader may be configured to twist into a fluid delivery attachment of the apparatus to lock the dispense cassette into the apparatus. The view on the left of FIG. 8 may show the dispense cassette 800 ready to be loaded. The view in the middle of FIG. 8 may show dispense cassette 800 loaded. The view on the right of FIG. 8 may show the dispense cassette locked.

Figure 9:
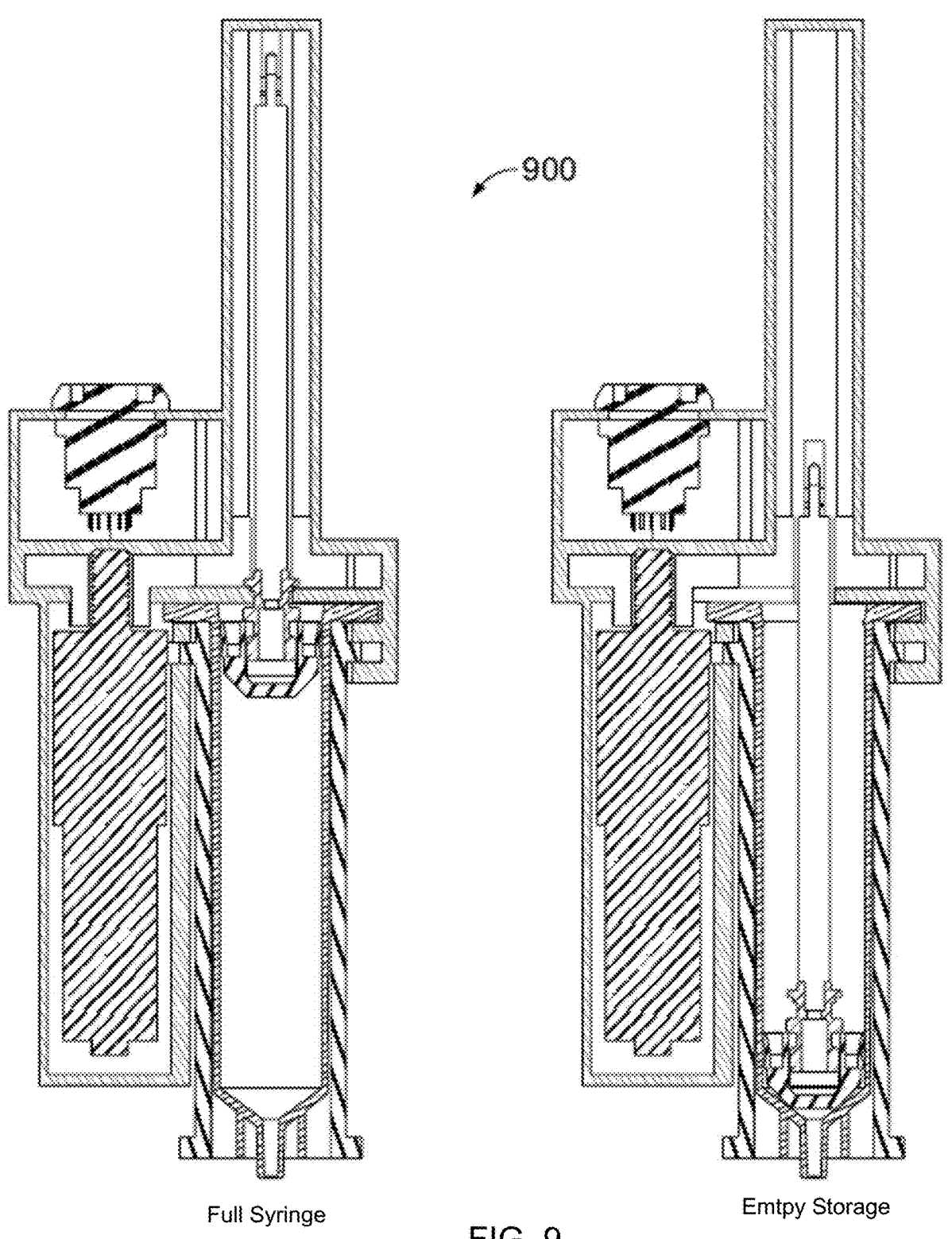
FIG. 9 illustrates cross-sectional views of a dispense cassette according to embodiments of the present disclosure.

Referring to FIG. 9, further cross-sectional views of a dispense cassette 900 according to embodiments of the present disclosure are shown. As shown, the dispense cassette 900 may include a linear drive motor system configured to operate the syringe. For example, as discussed above, the linear drive motor system may be configured to operate the syringe based on the pressure in the fluid channel. The linear drive motor system may be configured to operate the syringe to increase pressure in the fluid channel based on detection of low pressure in the fluid channel by the pressure sensor. Further, the linear drive motor system may be configured to operate the syringe to decrease pressure in the fluid channel based on detection of high pressure in the fluid channel by the pressure sensor. Thus, the pressure sensor, the linear drive motor system, the syringe, and the fluid channel may create a closed loop system configured to regulate pressure in the fluid channel. The view on the left side of FIG. 9 may show a full syringe. The view on the right side of FIG. 9 may show an empty syringe.

Thus, using the techniques and features described by the present disclosure, embodiments of an apparatus and/or dispensing system may include a piezo-actuated valve comprising a piezo actuator and a drive linkage configured to be actuated by the piezo actuator. The apparatus and/or dispensing system may include a dispense cassette comprising a syringe loadable by a twist to connect loader configured to twist into the dispense cassette to load the syringe. The apparatus and/or dispensing system may also include a linear drive motor system configured to operate the syringe.

Referring to FIG. 10, example operations of a method or process according to embodiments of the present disclosure are shown. In an embodiment, a process 1000 for regulating pressure in a dispensing system may include detecting (1002) a pressure in a fluid channel of the dispensing system with a pressure sensor (e.g., as shown in FIG. 6), wherein the pressure is created in part by a dispense cassette having a syringe and a piezo-activated valve system associated with the fluid channel. The process 1000 may further include, based on determining (e.g., by a controller, as described below) that the pressure in the fluid channel is lower than a low pressure threshold, operating (1004) the syringe with a linear drive motor system (e.g., as shown in FIG. 9, and, for example, via the controller as described below) of the dispense cassette to increase the pressure in the fluid channel.

Some or all of the following features may be included. The method may also include, based on determining (e.g., by the controller, as described below) that the pressure in the fluid channel is higher than a high pressure threshold, operating (1006) the syringe with the linear drive motor system (e.g., as shown in FIG. 9, and, for example, via the controller as described below) of the dispense cassette to decrease the pressure in the fluid channel. The pressure sensor, the linear drive motor system, the syringe, the fluid channel, and a controller as described below may create a closed loop system configured to regulate the pressure in the fluid channel.

Figure 11:
FIG. 11 illustrates an example controller according to embodiments of the present disclosure.

For example, and referring also to FIG. 11, the systems and methods described herein may include a controller, which may include a processor, memory, display, and/or other hardware to control the closed loop system. The closed loop system and related operations may include the pressure sensor sending one or more signals (e.g., representative of one or more pressure levels) to the controller 1100 (e.g., via a cable). The controller 1100 may then send one or more signals (e.g., representative of one or more commands) to the motor (e.g., the linear drive motor system) to advance or retract. In this way, the systems and methods described herein may be configured to use the controller as described above to yield a smart system including other components described herein. In an embodiment, a pressure sensor program or code module may be set (e.g., to indicate the low pressure threshold, the high pressure threshold, etc.), for example, via a controller interface such as a graphical user interface as shown in FIG. 11.

Figure 12:
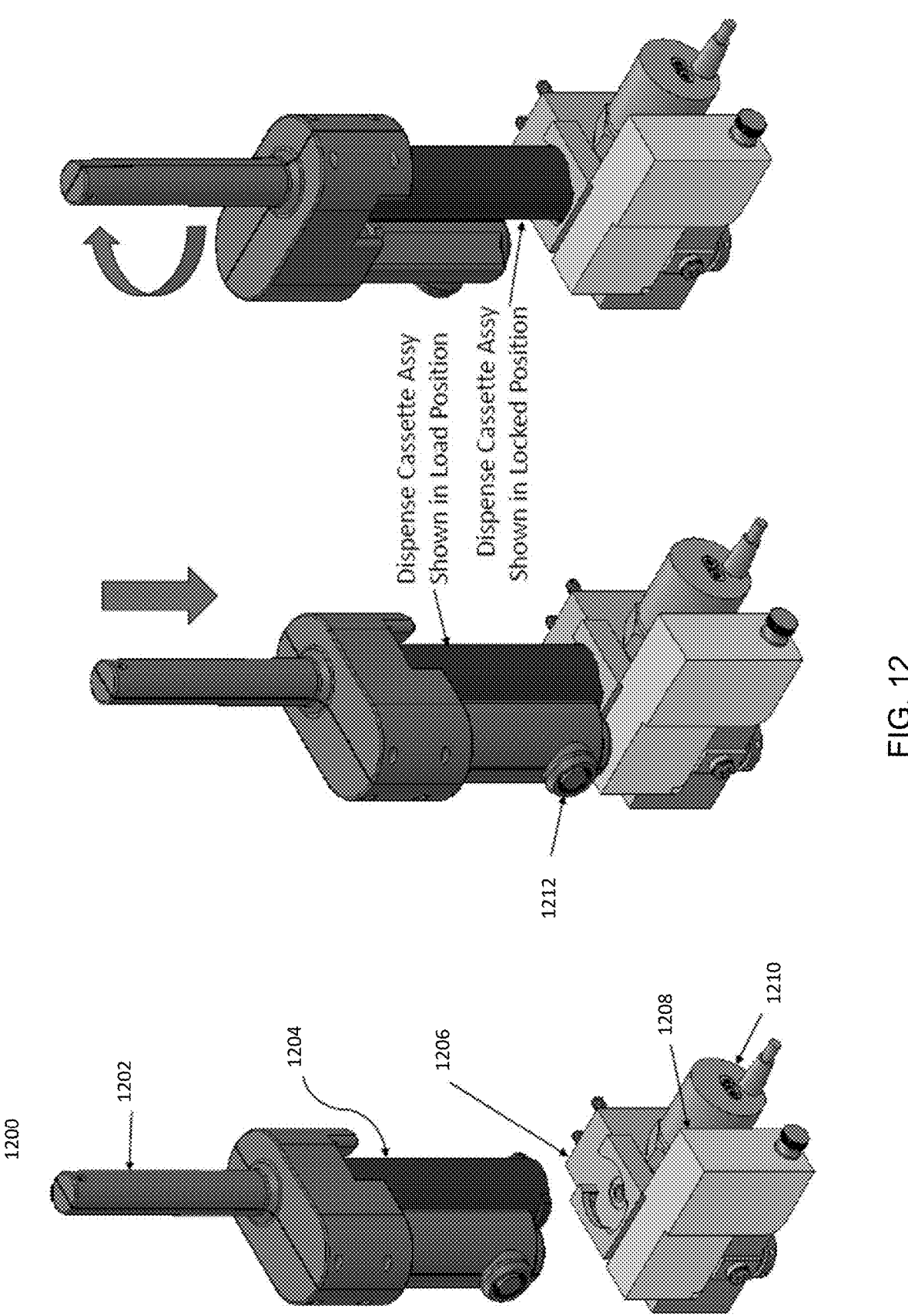
FIG. 12 illustrates an example apparatus according to embodiments of the present disclosure.
Figure 13:
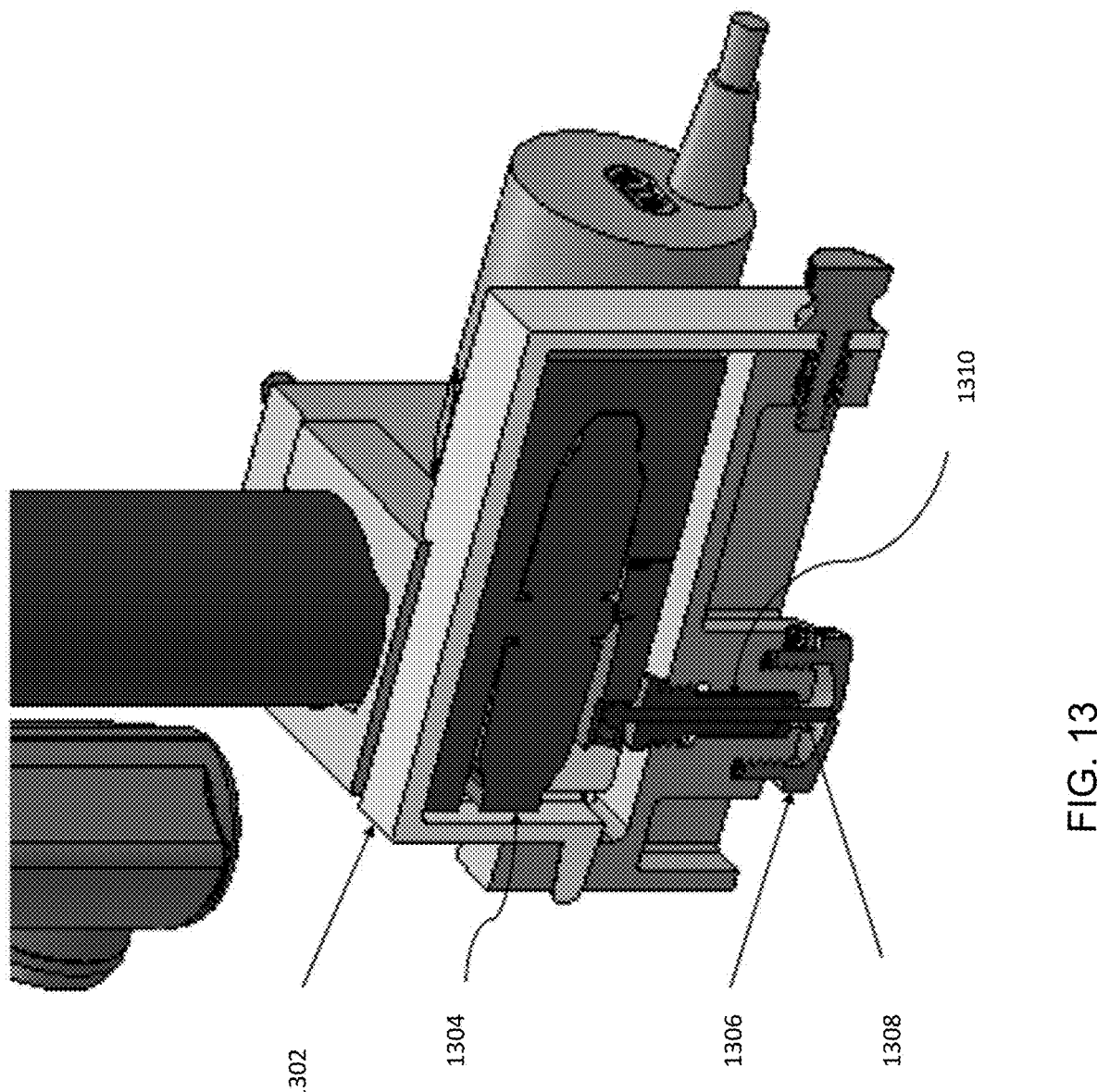
FIG. 13 illustrates an example apparatus according to embodiments of the present disclosure.
Figure 14:
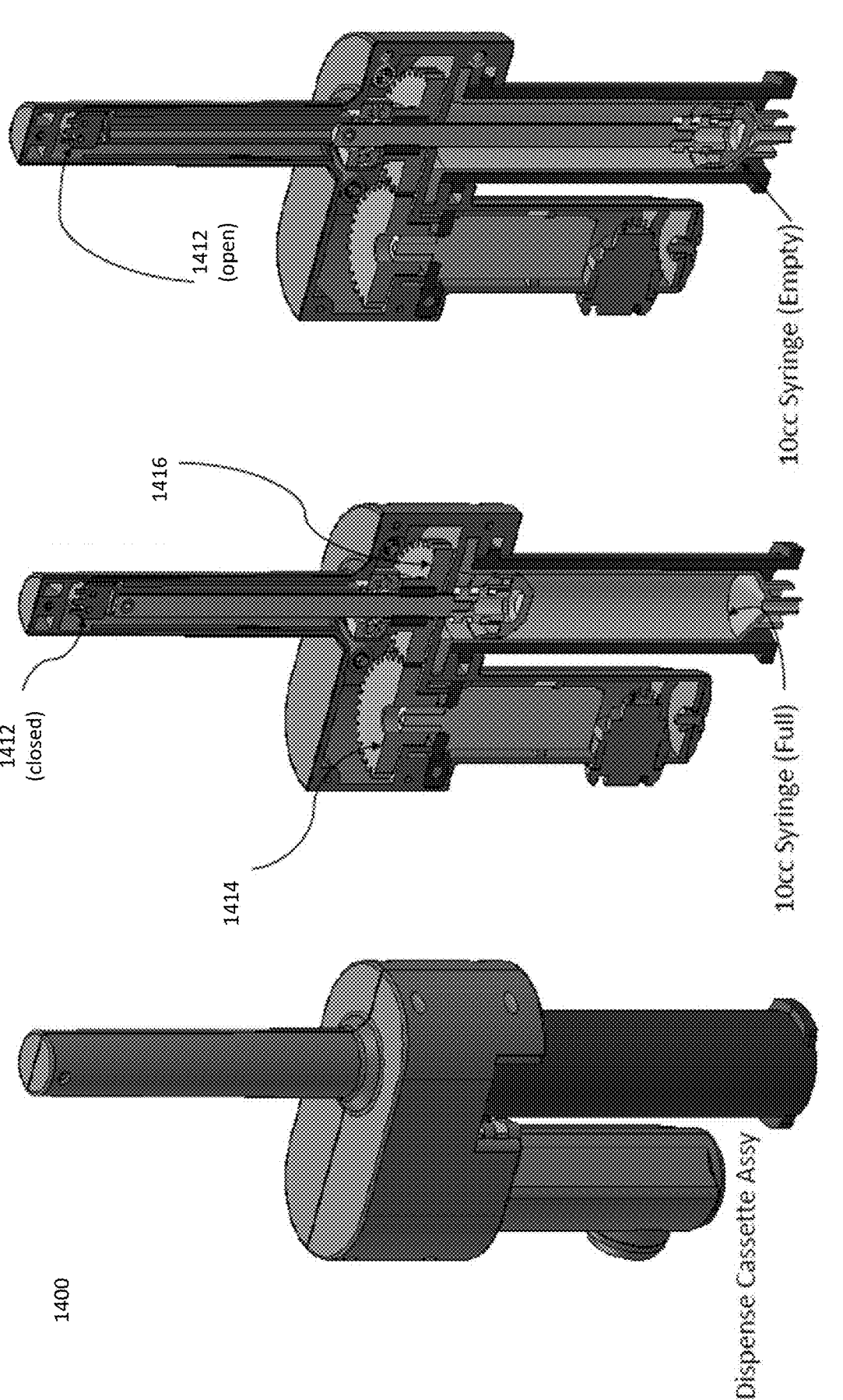
FIG. 14 illustrates an example apparatus according to embodiments of the present disclosure.
Figure 15:
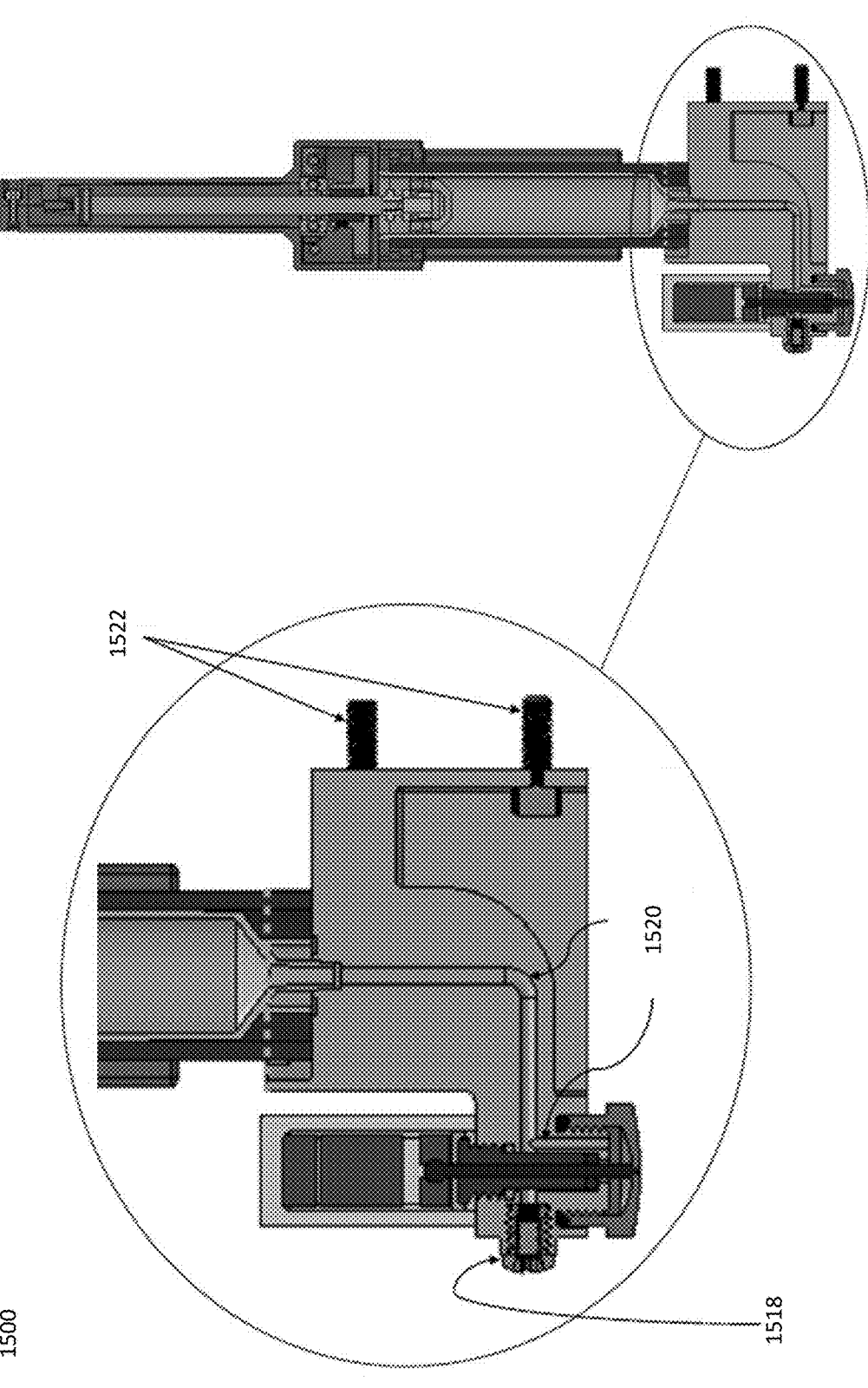
FIG. 15 illustrates an example apparatus according to embodiments of the present disclosure.

Referring now to FIGS. 12-15, additional embodiments consistent with the apparatus of the present disclosure are provided. As shown in FIG. 12, apparatus 1200 may include dispense cassette assembly 1202 having right half and left half housing portions. This is shown in the pre-loaded position. Any suitable material may be used (e.g., plastic, etc.). Cassette assembly 1202 may be connected to syringe cassette 1204, which may also be of any suitable material. Solder paste valve block 1206 may interface with LFPA piezo mounting block 1208 and pressure transducer 1210. Motor control interface connector 1212 is shown attached to cassette assembly 1202.

Referring again to FIG. 13, an embodiment showing an example apparatus 1300 is provided. Apparatus 1300 includes LFPA piezo mounting block 1302 and LFPA piezo actuator 1304. These may be constructed out of any suitable material, including, but not limited to, plastic, etc. Solder past jetting nozzle 1306 and solder paste plunger 1308, and O-ring packing screw 1310 are also shown. These may be constructed out of any suitable material, including, but not limited to, stainless steel, etc.

Referring again to FIG. 14, an embodiment showing an example apparatus 1400 is provided. Apparatus 1400 includes limit switch 1412 shown in the closed and open positions. Motor/drive gear assembly 1414 and dispense gear assembly 1416 with thrust bearing, lead screw and nut, hub and piston are also shown.

Referring again to FIG. 15, an embodiment showing an example apparatus 1500 is provided. Apparatus 1500 shows channel cleanout screw 1518, solder paste delivery channel 1520, and mounting screw(s) 1522.

In operation, controller 1100 may cause the dispense cassette motor to retract the leadscrew to its upper position. The syringe cassette may be removed by rotating it clockwise. A fully loaded 10 cc syringe, with piston in place, may be installed within the dispense cassette and locked in place by rotating the syringe either clockwise or counterclockwise. The syringe cassette may then be slipped up over the syringe until it bottoms against the underside of the syringe's ears. It is then locked in place by rotating it counterclockwise. The now fully loaded dispense cassette assembly may then be introduced to the solder paste valve block 1206, bottoming it against the mounting face and then locked into place by rotating the entire assembly clockwise. Controller 1100 then starts the dispense cassette motor, driving the syringe's piston down. This action fills the solder paste delivery channels and the solder paste jetting nozzle 1306 with solder paste with the solder paste plunger 1308 remaining closed. The dispense cassette motor continues to drive the syringe's piston down, increasing the pressure within the system.

In some embodiments, the pressure transducer communicates with controller 1100, reporting the constantly increasing system pressure. When the preset limit is reached, the piezo actuator is activated and begins rapidly raising and lowering (upstroke/downstroke) the solder paste plunger 1308, thus opening the orifice in the solder paste jetting nozzle 1306. Solder paste then flows into the orifice and is immediately jetted out by the rapid down stroke of the solder paste plunger 1308. The volume of solder paste is programmable based on the duration of the stroke, with the maximum stroke occurring when the orifice is allowed to fill completely. Solder paste nozzles 1306 with different sized orifices and matching solder paste plungers 1308 may also be used to provide virtually unlimited volumes. Some or all of the embodiments included herein may be mounted on a robot, controlled by controller 1100, which synchronously positions it over its specific target(s) and moves it from target to target. Controller 1100 counts the motor pulses and converts that value to the distance the piston has traveled within the syringe and thus knows when the syringe is empty and brings the leadscrew and piston back to the install position so it can be removed and replaced with a full syringe and the process can resume from where it left off.

It should be noted that while examples included herein may discuss solder paste specifically, it should be noted that this is provided merely by way of example. Numerous other materials may be used without departing from the scope of the present disclosure.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f) for any limitations of any of the claims herein, except for those in which the claim expressly uses the words 'means for' or 'step for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A dispensing apparatus comprising:
a piezo-actuated valve;
a dispense cassette;
wherein the dispense cassette comprises a syringe loadable by a twist to connect loader; and
wherein a bottom portion of the twist to connect loader is configured to twist into a fluid delivery attachment of the apparatus to lock the dispense cassette into the apparatus.

2. The dispensing apparatus of claim 1, wherein the piezo-actuated valve comprises:
a piezo actuator; and
a drive linkage configured to be actuated by the piezo actuator.

3. The dispensing apparatus of claim 1, wherein the piezo-actuated valve comprises:
a tappet having an open position and a closed position based on a piezo actuator of the piezo-actuated valve.

4. The dispensing apparatus of claim 1, wherein a top portion of the twist to connect loader is configured to twist into the dispense cassette to load the syringe.

5. The dispensing apparatus of claim 1, wherein the dispense cassette comprises a linear drive motor system configured to operate the syringe.

6. The dispensing apparatus of claim 5, further comprising a fluid reservoir and a fluid channel.

7. The dispensing apparatus of claim 6, further comprising a pressure sensor configured to detect pressure in the fluid channel.

8. The dispensing apparatus of claim 7, wherein the linear drive motor system is configured to operate the syringe based on the pressure in the fluid channel.

9. The dispensing apparatus of claim 7, wherein the linear drive motor system is configured to operate the syringe to increase pressure in the fluid channel based on detection of low pressure in the fluid channel by the pressure sensor.

10. The dispensing apparatus of claim 7, wherein the linear drive motor system is configured to operate the syringe to decrease pressure in the fluid channel based on detection of high pressure in the fluid channel by the pressure sensor.

11. The dispensing apparatus of claim 7, wherein the pressure sensor, the linear drive motor system, the syringe, and the fluid channel create a closed loop system configured to regulate pressure in the fluid channel.

\* \* \* \* \*